United States Patent Office.

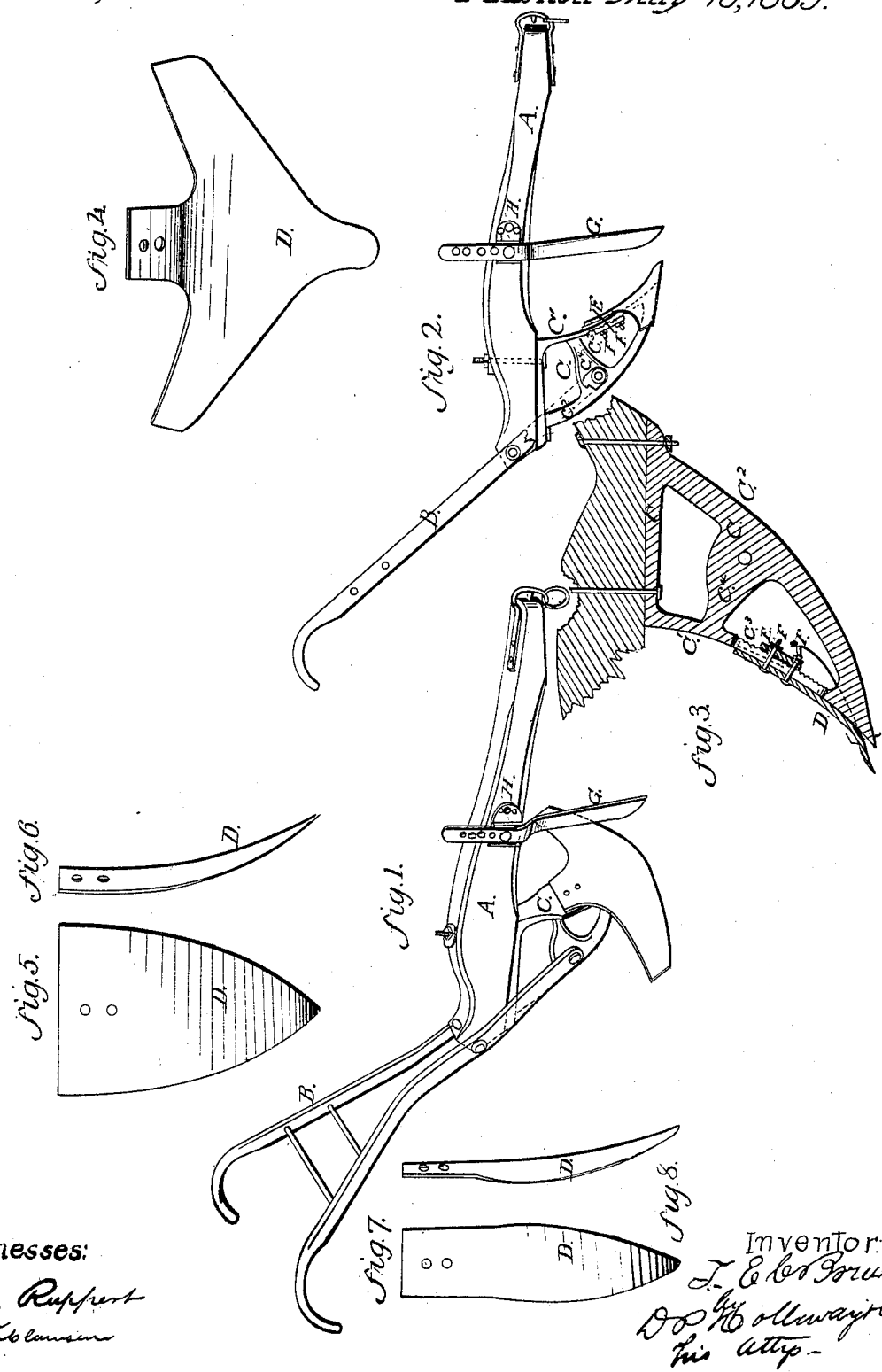

T. E. C. BRINLY, OF LOUISVILLE, KENTUCKY.

Letters Patent No. 90,232, dated May 18, 1869.

IMPROVEMENT IN PLOWS.

The Schedule referred to in these Letters Patent and making part of the same.

*To all whom it may concern:*

Be it known that I, T. E. C. BRINLY, of Louisville, in the county of Jefferson, and State of Kentucky, have invented a new and useful Improvement in Plows; and I do hereby declare that the following is a full, clear, and exact description of the same, reference being had to the annexed drawings, making part of this specification, in which—

Figure 1 is a perspective view of a plow, (of the class commonly known as cotton-sweeps,) with my improvement attached;

Figure 2 is a side elevation of the same;

Figure 3 is a vertical section; and

Figures 4, 5, 6, 7, and 8, are elevations of different forms of shovels.

The same letters, in the several figures, are used to designate identical parts.

My improvements relate to the frame or stand to which the shovels are attached to the beam of a plow, and also the mode of attaching the cutter, such as is used for cutting pea-vines, and for other analogous uses.

In the annexed drawings—

A is the beam of the plow, to which the handles B are bolted.

Said handles extend below the beam, and are bolted to the frame or stand C, which carries the shovel.

This stand is constructed as clearly shown in figs. 2 and 3. The part $c$ is bolted under the beam, and the front, $c^1$, extending downwards, inclining forward at its point, receives the shovel D. The rear portion $c^2$, curved forward, braces the front portion, with which it is connected in the middle, by the cross-brace $c^4$.

In the front portion, $c^1$, is a vertical slot, to receive the bolts F F, by which the shovels are attached.

The rear face of the part $c^1$ is notched, and so is also the opposing face of the washer-plate E, through which the bolts F F pass, so that the shovel may be adjustably attached and held very firmly in place.

I have shown, in figs. 4, 1, 5, 6, and 7, several forms of shovels, adapted to various uses, either of which may be attached to the stand, by the means indicated.

The cutter G is attached in front of the shovel, and intended to cut such vines as would interfere with the operation of the shovel. It is adjustably attached, by a bolt passing through either one of a series of holes, as shown in the drawings, to a plate H, attached to the beam.

This plate H is constructed with a recess to receive the cutter, and hold it as in a socket, and it is adjustably attached to the beam, by two bolts passing through two of a series of three or more holes in said plate, so that, by shifting the bolts, different angles may be given to the cutter, as may be required.

I do not claim the cutter, or any of the shovels, as being new, but my invention relates only to the mode of attaching them, which I believe to be new.

What I claim as my invention, and desire to secure by Letters Patent, is—

1. The frame C, constructed substantially as and for the purpose set forth.

2. The combination of the shovel, the frame C, constructed with a notched surface at $c^3$, and the notched plate E, and bolts F, substantially as set forth.

3. The adjustable cutter G, when attached to the beam by an adjustable plate, H, and arranged in front of the share, to operate substantially as and for the purpose set forth.

In testimony whereof, I have signed my name to this specification, in the presence of two subscribing witnesses.

T. E. C. BRINLY.

Witnesses:
J. EDWARD HARDY,
J. E. BADGER.